United States Patent [19]

Warfel

[11] Patent Number: 4,636,540

[45] Date of Patent: Jan. 13, 1987

[54] PURIFICATION OF POLYMER SOLUTIONS

[75] Inventor: David R. Warfel, Exton, Pa.

[73] Assignee: Atlantic Richfield Company, Los Angeles, Calif.

[21] Appl. No.: 752,751

[22] Filed: Jul. 8, 1985

[51] Int. Cl.$^4$ ............................................. C08J 3/08
[52] U.S. Cl. .................................. 523/310; 526/173; 528/482
[58] Field of Search ....................... 523/310; 528/482; 526/173

[56] References Cited

U.S. PATENT DOCUMENTS

| 2,977,346 | 3/1961 | Cull | 528/482 |
|---|---|---|---|
| 3,176,037 | 3/1965 | Warner | 528/482 |
| 3,209,050 | 9/1965 | Hanson | 528/482 |

FOREIGN PATENT DOCUMENTS

| 786127 | 11/1957 | United Kingdom | 528/482 |
|---|---|---|---|
| 884490 | 12/1961 | United Kingdom | 528/482 |
| 947111 | 1/1964 | United Kingdom | 528/482 |

Primary Examiner—Joseph L. Schofer
Assistant Examiner—N. Sarofim
Attorney, Agent, or Firm—Lewis J. Young

[57] ABSTRACT

Cloudy material in organic diluent solutions of macromonomers, prepared by anionic polymerization with a lithium initiator and termination with a halogen-containing terminating agent is removed by treating the polymer solutions resulting from the polymerization with an adsorbent selected from an alkaline earth metal silicate, an ion exchange resin, and a mixture of the silicate and ion exchange resin composition, separating the solid material from the solutions, and isolating the macromonomer.

12 Claims, No Drawings

PURIFICATION OF POLYMER SOLUTIONS

BACKGROUND OF THE INVENTION

This invention relates to the purification of non-aqueous polymer solutions and more particularly to elimination of the hazy, cloudy or milky appearance often observed in organic solutions of polymers prepared by anionic polymerization.

A common occurrence when redissolving in an organic medium polymers synthesized with an anionic initiator is a cloudy, milky or hazy appearance indicative of a residue of the polymerization reaction. Usually, the polymer solution directly resulting from the anionic polymerization will be clear and the cloudy condition will appear when the polymer is isolated and redissolved. Sometimes the hazy appearance also occurs upon aging of a polymer solution directly resulting from the synthesis. Purification is exceedingly difficult to achieve by conventional filtration practiced alone or with filtration aids. For example, the impurities have been found resistant to treatment with adsorbents such as alumina, talc, silica gel, various forms of alumina, clays and carbon black. The impurities in such solutions have also been found resistant to conventional salting out techniques using materials such as sodium chloride, sodium acetate, sodium carbonate, sodium bicarbonate and calcium carbonate.

Removal of the impurities is important for many commercial uses of the polymers and organic diluent solutions of such polymers, for example when the polymers are intended for use as clear top coats for laminates and other substrates, or in adhesives. In this specification the term "impurity" or similar term means an undesired material in an organic diluent solution of such polymers observable as a cloudy, milky or hazy condition, and "purification" means total removal or substantial reduction of such material.

SUMMARY OF THE INVENTION

In accordance with the present invention, impurities observable as cloudy material in organic diluent solutions of polymers prepared by anionic polymerization are conveniently removed by contacting the polymer solutions with an adsorbent selected from an alkaline earth metal silicate, an ion exchange resin, and mixtures of the silicate and the ion exchange resin, and separating solid phase material by filtration or similar means. The resulting polymers when isolated and redissolved in organic diluents, form solutions which are substantially clear and water-white.

DETAILED DESCRIPTION

The polymers which may be purified in accordance with the invention are those prepared from monomers susceptible to anionic polymerization. In most cases, such monomers are those having a polymerizable olefinic group such as vinyl, vinylidene, or vinylene containing compounds. The anionic polymerization may be a homopolymerization or the copolymerization of two or more different monomers including monomers of different functionality, such as the copolymerization of ethylenically unsaturated monomers with epoxy or thioepoxy monomers. In anionic polymerization, a monomer or combination of monomers is polymerized under anhydrous conditions in an organic diluent in the presence of a lithium-based initiator such as lithium metal, alkyl lithium compounds, aryl lithium compounds or mixtures thereof such as disclosed in U.S. Pat. No. 3,317,918. The preferred initiators are alkyl lithium compounds such as the lower alkyl lithium compounds, of which butyl lithium, e.g., sec. butyl lithium, is the initiator of choice.

The organic diluent may be inert or may be what is commonly termed a "reactive diluent," that is, a liquid comonomer capable of anionically initiated copolymerization with the primary monomer. More usually, the organic diluent is an inert organic solvent commonly employed in solution polymerization, such as butane, hexane, toluene, cyclohexane, methylcyclohexane, heptane, pentane, isopentane, tetrahydrofuran, benzene and the like. Mixtures of reactive diluents and such inert organic solvents are also useful.

The initial result of the anionic polymerization is a "living polymer", that is, a polymer having a terminal atom carrying a negative charge. This polymer may then be copolymerized with another monomer or reacted with a halogen-containing or other terminating agent. In many cases, however, the polymeric anion is highly reactive and non-selective in its reaction with the terminating agent and results in polymer chains which have undesired functionality and molecular weight. Such undesirable consequences can be avoided by rendering the living polymer less reactive by capping with a less reactive end group prior to termination. Suitable capping agents include lower alkylene oxides or sulfides such as ethylene and propylene oxide or sulfide.

When the terminating agent itself contains alpha, beta-ethylenic unsaturation or other polymerizable group, the resulting polymeric material is a macromolecular monomer also known as a "macromonomer". Anionically polymerized polymers of this type are described in U.S. Pat. Nos. 3,786,116 and 3,842,059 to Milkovich et al, in European patent publication No. 104,046 filed Sept. 9, 1983 by Husman et al, and in the Sarkar patent mentioned above.

Preferably, the macromonomers have a molecular weight of at least 2,000, e.g., about 3,000 to 50,000, more preferably about 4,000 to 30,000, and the molecular weight distribution ("polydispersity") ranges up to 3 or more, preferably up to about 2. Illustrative macromonomers are described in the Examples below.

Accordingly, the present invention contemplates the treatment of all anionically synthesized polymers prepared from monomers of which the following are illustrative: vinyl aromatic compounds, such as styrene, alpha-methylstyrene, p-tert. butyl styrene, indene vinyl toluene and its isomers; vinyl unsaturated amides such as acrylamide, methacrylamide, N,N-dilower alkyl acrylamides, e.g., N,N-dimethylacryalmide; acenaphthalene; 9-acrylcarbazole; acrylonitrile and methacrylonitrile; organic isocyanates including lower alkyl, phenyl, lower alkyl phenyl and halophenyl isocyanates; organic diisocyanates including lower alkylene, phenylene and tolylene diisocyanates; lower alkyl and allyl acrylates and methacrylates including methyl, t-butyl acrylates and methacrylates; lower olefins, such as ethylene, propylene, butylene, isobutylene, pentene, hexene, and the like; vinyl esters of aliphatic carboxylic acids such as vinyl acetate, vinyl propionate, vinyl octoate, vinyl oleate, vinyl stearate, vinyl benzoate; vinyl lower alkyl ethers; vinyl pyridines, vinyl pyrrolidones; dienes including isoprene and butadiene; lactams and lactones such as caprolactam and caprolactone; alkylene oxides such as ethylene oxide and propylene oxides; and aldehydes including formaldehyde and acetaldehyde. The term "lower" is used above to denote organic groups containing eight or fewer carbon atoms. The preferred olefinic containing monomers are conjugated dienes containing 4 to 12 carbon atoms per molecule and the vinyl-substituted aromatic hydrocarbons containing up to about 12 carbon atoms.

Many other suitable monomers are disclosed in Macromolecular Reviews, vol. 2, pp. 74–83, Interscience Publishers, Inc. (1967), entitled "Monomers Polymerized by Anionic Initiators." The disclosures of the aforementioned patents and publication are incorporated herein by reference.

From the foregoing discussion, it will be apparent that upon termination of the anionic polymerization with a halogen-containing compound, a lithium salt is a by-product. If termination is with a compound not containing halogen ions, the lithium may combine with other ionic species and form a hydride or hydroxide, for example. However, even when halogen ion is present, such hydrides or hydroxides may form. Preferably, termination with water is avoided, since water tends to cause emulsification and thereby impede filtration or other technique used to remove solid phase material from the polymer solution after the boric acid treatment. Analysis of the material which is separated in the purification method of the invention suggests that it is a lithium halide, hydride or hydroxide, or some form of complex involving lithium, which is responsible for the cloudy material observed upon aging for several months of a freshly synthesized polymer solution or upon redissolving untreated (freshly prepared) polymer in an organic diluent. In the latter case, the cloudy condition is not observed in the polymer solution immediately resulting from the anionic polymerization; the cloudy material appears only when the freshly prepared polymer product is isolated in solid form and then redissolved in the organic diluent.

The first step in practicing the method of the invention is therefore to contact the polymer solution resulting from the anionic polymerization with the alkaline earth metal silicate, ion exchange resin adsorbent or mixture thereof. The alkaline earth metal silicates include magnesium and calcium silicate in any of their crystalline forms (ortho, meta and others) and mixtures of such silicates. Calcium silicate is preferred.

The ion exchange resin may be a single resin containing anionic or cationic exchange functionality, a single resin containing both anionic and cationic functionality (amphoteric resin) or may be a mixture, hybrid or composite of anionic and/or cationic ion exchange resins. Furthermore, both gel and macroreticular resins are useful, although the macroreticular resins are preferred because of their high porosity and the consequent greater opportunity for adsorbing impurities from the polymer solutions as well as exchanging with halogen, hydroxide or hydride ion which may be the source of the impurities in the polymer solutions. The ion exchange resins may be used as beads, ground material, powders, or other form. The ground or powdery resins are preferred due to higher surface area but in some cases the beads are preferred by reason of greater convenience of separation.

It will thus be understood that the term "adsorbent" or "adsorbing", when used in this specification to describe the treating agents or treating method found effective to remove or reduce impurities in polymer solutions in accordance with the invention, means and includes physical adsorption of such impurities as well as chemical reaction or ion exchange with the offending species.

Typical of the ion exchange resins useful in the invention are the macroreticular vinyl aromatic or acrylic resin adsorbents and exchangers described in U.S. Pat. Nos. 3,037,052, 3,637,535, 3,843,566, 3,791,866, 3,275,548 and 3,357,158, the hybrid resins described in U.S. Pat. No. 3,991,017, the composite resins described in U.S. Pat. No. 3,645,922 and the amphoteric resins described in U.S. Pat. No. 4,202,737.

As is well known, particulate ion exchange resins are prepared by first forming a crosslinked polymer matrix (usually by suspension polymerization but also by emulsion polymerization as in U.S. Pat. No. 4,380,590) and then functionalizing the polymer particles to provide anionic, cationic or amphoteric ion exchange capacity. In such manner, individual weakly or strongly basic, or acidic, ion exchange resins may be prepared, and then used singly or in admixture in the present invention. To date, best results have been obtained with weak acid resins, mixtures of weak acid and strong base resins, and mixtures of weak acid and strong acid resins. Alternatively, as mentioned, hybrid or composite resins may be prepared, or the individual resins may be functionalized to provide ion exchange capacity. A great variety of ion exchange resins and adsorbents are commercially available for use in the invention, presenting opportunity for tailoring the treatment to the specific anionic polymer system to be purified. All of the patents cited above for description of ion exchange resins and/or adsorbents are herein incorporated by reference.

The amount of adsorbent for the treatment will depend on various factors, including the state of subdivision of the adsorbent. Generally, at least about 1 wt. % of adsorbent, based on polymer solids in the polymer solution, will be effective. Preferred amounts are about 4 wt. % to 20 wt. %, on the same basis.

In batch treatments the mixture of polymer and adsorbent typically is agitated in organic diluent for about 1–3 hours at 50°–60° C. for a 40–60% polymer solids solution containing about 10 wt. % adsorbent on polymer solids. For higher polymer solids solutions and/or lower concentration of adsorbent, a longer treatment time may be required, and the conditions of agitation and temperature may be adjusted accordingly.

After contact of the polymer solution with the adsorbent, the solid phase material in the polymer solution is separated. The separation is effected by decanting, filtration (by gravity or with a vacuum or other filtering aid), centrifugation or other convenient separatory process. The purified polymer is then isolated in the conventional manner, as by vacuum drying, devolatization extrusion or by precipitation in excess methanol followed by vacuum drying or evaporation with a wiped thin film evaporator.

In an alternate method of treating the polymer solution, the polymer solution is passed through a bed of the metal silicate, ion exchange resin or mixture thereof. The bed can be contained in a column packed with the adsorbent (alone or with filtering aids) and containing fine screens at both ends, allowing the solution to pass through but holding back the adsorbent. Another apparatus is in a pressure filter of the Niagara or Sparkler type. Such pressure filters have a multiplicity of plates (e.g., about 7–30) covered by filter paper to support and hold back the adsorbent bed while allowing the liquid to pass.

The polymer solution to be treated is passed upwardly through a perforated conduit centrally positioned in the pressure filter chamber and the solution passes through the filter plates to the outer walls of the chamber from where it flows downwardly to an exit.

The column and pressure filter can each be used in single or multiple pass, or continuous recirculation modes. In the later mode, the solution can be pumped out of an adjacent polymerization reactor, through the column or pressure filter, and back into the reactor. The recirculation may be continued until the desired purity is obtained in the polymer solution.

Through-put rates may be adjusted in the column or pressure filter as required for adequate contact time and efficient purification. For a 200 lb. adsorbent bed, for example, a polymer solution (about 40–60% solids) through-put of about 10 gal./min. will be effective.

The effectiveness of the purification treatment is conveniently confirmed by dissolving the treated, isolated polymer in an organic diluent and observing the resulting solution. The treatment has been effective if the solution is substantially clear and water-white. The organic diluent used in this test may be the same diluent used to form the polymer solution as part of the treatment with adsorbent and thus includes an inert organic solvent such as cyclo-hexane or toluene, a reactive diluent (of which 1,6-hexanediol diacrylate is representative), or a mixture of an inert organic solvent and a reactive diluent. Typical reactive diluents are the liquid monomers or oligomers of up to about 2000 molecular weight selected from mono- or polyethylenically unsaturated monomers such as described in U.S. Pat. Nos. 4,382,135, 4,399,192, 4,163,809, 4,481,258, 4,360,540, 3,368,900, 3,380,831 and 3,594,410, incorporated herein by reference.

In the separation step, filtering aids conventionally used in organic separatory processes may be employed such as kieselguhr, diatomaceous earth, molecular sieves, sintered glass and membranes of various types.

The following examples will further illustrate the invention but are not intended to necessarily limit the scope thereof. In the examples and throughout the specification and claims, all parts and percentages are by weight unless otherwise stated.

EXAMPLE 1

(A) Preparation of Macromonomer: Polystyrene Terminated with Methacryloyl Chloride A glass and stainless steel reactor was charged with 1000 grams of cyclohexane and 1500 grams of styrene. To the mixture was added 79.6 ml of s-butyl lithium solution (1.45M in cyclohexane). The temperature was maintained at 60° C. for 30 minutes and 61.6 grams of ethylene oxide was added. The reaction was held at 60° C. for another 45 minutes. To the resulting solution was added 16.9 grams of methacryloyl chloride to give a macromonomer of 13,000 molecular weight, measured by GPC. The product polymer solution was clear and water-white.

(B) Purification

The polymer solution of Part A above was adjusted to 60% polymer solids in cyclohexane. To 100 gram samples of the polymer solution in each of 2 citrate bottles was separately added 5 and 7.5 grams of calcium silicate (Microcel E, Johns-Manville). The samples were mildly agitated by end-over-end rotation for 90 minutes at 60° C., then suction filtered through a 40–60 micron sintered glass funnel to remove solid material. The polymer in each filtrate was then separated by vacuum drying. The solid polymer samples were redissolved in 5 grams of 1,6-hexanediol diacrylate and formed clear, water white solutions as compared with a cloudy control (untreated) polymer solution. Chloride ion analyzed 310 ppm for the 5 gram silicate/polymer solution, 43 ppm for the 7.5 gram silicate/polymer solution and 7900 ppm for the control sample.

EXAMPLE 2

100 grams of the clear, water-white polymer solution (60% polymer solids in cyclohexane) prepared in Example 1, Part A was added to each of four citrate bottles. Varying amounts of granular magnesium silicate ("Celkate,", Johns-Manville) were then added to each bottle and the bottles were rotated overnight (about 18 hours) at 60° C. as described in Example 1, Part B. After treatment, the mixture in each bottle was suction filtered through a 25–50 micron sintered glass funnel to remove solid material and the filtrates vacuum dried to leave the solid polymer. The solid polymer samples were then redissolved in 5 grams of 1,6-hexanediol diacrylate and observed for clarity. The results are shown in Table I below from which it will be seen that the slight haze remained in the polymer solutions treated with 8 and 12 wt. % magnesium silicate but the haze was removed with the 16 wt. % treatment.

TABLE I

| Sample No. | Magnesium Silicate | Appearance on Redissolving | Chloride Analysis (ppm) |
|---|---|---|---|
| 1 (control) | — | cloudy | — |
| 2 | 8 | slightly hazy | 1271 |
| 3 | 12 | slightly hazy | 1203 |
| 4 | 16 | clear | 78 |

EXAMPLE 3

The treatment of Example 1 was repeated in all essential respects except for substitution of 10 grams of an ion exchange resin mixture for the calcium silicate. The ion exchange resins in the mixture were a weakly acidic resin ("Amberlite CG-50," Rohm and Haas Company, 5 grams) and a strongly basic macroreticular resin ("Amberlyst A-26," Rohm and Haas Company, 5 grams). Upon redissolving of the treated and separated polymer, the polymer solution was slightly hazy as compared with the dense cloudy appearance of a control (untreated polymer). The chlorides were reduced from 8824 ppm in the control to 2310 ppm. In a similar experiment, employing the "Amberlite CG-50" resin alone, the resulting polymer solution was clear and light amber in color, and chlorides were reduced from 8824 ppm (control) to 3162 ppm.

EXAMPLE 4

Substantially as described in Example 1, solutions of the below-listed polymers in cyclohexane are prepared, treated with 10% by weight calcium silicate on polymer solids, filtered, redissolved in 1, 6-hexanediol diacrylate and observed for clarity. The treatment removes cloudy impurities which appear in untreated samples of the redissolved polymer solutions.

(a) polystyrene terminated with acryloyl or methacryloyl chloride;

(b) polystyrene capped with ethylene oxide or ethylene sulfide and terminated with acryloyl or methacryloyl chloride;

(c) polystyrene capped with ethylene oxide or ethylene sulfide and terminated with chloromethyl styrene;

(d) polystyrene capped with ethylene oxide or ethylene sulfide and terminated with epichlorohydrin;

(e) polystyrene terminated with allyl chloride;

(f) polybutadiene capped with ethylene oxide or ethylene sulfide and terminated with acryloyl or methacryloyl chloride; and (g) any of polymers (a) to (e) with poly alpha-methylstyrene in place of polystyrene.

I claim:

1. A method of purifying a vinyl aromatic macromonomer prepared by anionic polymerization in an organic diluent in the presence of a lithium initiator and termination with a polymerizable, halogen-containing terminating agent, said method comprising (a) contacting the macromonomer solution resulitng from the polymerization and termination, with an adsorbent selected from an alkaline earth metal silicate, an ion exchange resin, and a mixture of said silicate and resin, to form a liquid phase and a solid phase, (b) separating the solid phase from the liquid phase, and (c) isolating the macromonomer from the liquid phase.

2. The method of claim 1 wherein the adsorbent is calcium silicate.

3. The method of claim 1 wherein the adsorbent is magnesium silicate.

4. The method of claim 1 wherein the adsorbent is calcium silicate in an amount of at least about 4 wt. % based on polymer weight.

5. The method of claim 1 wherein the adsorbent is a mixture of anionic and cationic ion exchange resins.

6. The method of claim 5 wherein the cationic ion exchange resin is strongly acidic and the anionic ion exchange resin is strongly basic.

7. The method of claim 1 wherein the molecular weight of the macromonomer is at least 3,000.

8. The method of claim 1 wherein the lithium initiator is alkyl lithium.

9. The method of claim 1 wherein the molecular weight of the macromonomer is at least 3,000, the lithium initiator is alkyl lithium, and the adsorbent is calcium silicate.

10. The method of claim 1 wherein the adsorbent is contained in a filter bed and the macromonomer solution is contacted with the adsorbent by passage through the bed.

11. The method of claim 10 wherein the filter bed is contained in a packed column.

12. The method of claim 1 wherein the macromonomer is selected from:

(a) polystyrene terminated with acryloyl or methacryloyl chloride;

(b) polystyrene capped with ethylene oxide or ethylene sulfide and terminated with acryloyl or methacryloyl chloride;

(c) polystyrene capped with ethylene oxide or ethylene sulfide and terminated with chloromethyl styrene;

(d) polystyrene capped with ethylene oxide or ethylene sulfide and terminated with epichlorohydrin;

(e) polystyrene terminated with allyl chloride;

(f) polybutadiene capped with ethylene oxide or ethylene sulfide and terminated with acryloyl or methacryloyl chloride; and (g) any of polymers (a) to (e) with poly alpha-methylstyrene in place of polystyrene.

* * * * *